United States Patent
Lyons et al.

(10) Patent No.: US 9,049,351 B2
(45) Date of Patent: Jun. 2, 2015

(54) INSULATOR DESIGN FOR VIDEO INSPECTION DEVICES

(75) Inventors: Brent Lyons, Howell, MI (US); Al Boehnlein, Ypsilanti, MI (US); Tye Newman, Howell, MI (US); Jeffrey C. Schober, Plymouth, MI (US); Aaron Scarth, Zeeland, MI (US); Jeff Plane, West Bloomfield, MI (US)

(73) Assignee: Inspectron, Inc., Novi, MI (US)

( * ) Notice: Subject to any disclaimer, the term of this patent is extended or adjusted under 35 U.S.C. 154(b) by 723 days.

(21) Appl. No.: 13/099,495

(22) Filed: May 3, 2011

(65) Prior Publication Data

US 2011/0273556 A1 Nov. 10, 2011

Related U.S. Application Data (60) Provisional application No. 61/330,594, filed on May 3, 2010.

(51) Int. Cl.
*H04N 7/18* (2006.01)
*G02B 23/24* (2006.01)
*H04N 9/47* (2006.01)

(52) U.S. Cl.
CPC ........... *H04N 7/183* (2013.01); *Y10T 29/49002* (2015.01); *G02B 23/2484* (2013.01)

(58) Field of Classification Search
USPC ........... 348/65, 68, 85, 75, 76, 82, 84, 86, 87; 600/109, 112, 129, 130, 160, 171, 110
See application file for complete search history.

(56) References Cited

U.S. PATENT DOCUMENTS

| | | | |
|---|---|---|---|
| 3,296,363 A | 1/1967 | Laudig et al. | |
| 4,209,742 A * | 6/1980 | Bender et al. | ................ 324/72.5 |
| 4,467,802 A | 8/1984 | Maslanka | |
| 4,471,766 A | 9/1984 | Terayama | |
| 4,779,130 A | 10/1988 | Yabe | |
| 5,136,237 A * | 8/1992 | Smith et al. | ................... 324/149 |
| 5,433,725 A | 7/1995 | Christian et al. | |
| 5,527,261 A | 6/1996 | Monroe et al. | |
| 5,651,699 A | 7/1997 | Holliday | |
| 5,667,473 A | 9/1997 | Finn et al. | |
| 5,752,973 A | 5/1998 | Kieturakis | |
| 5,754,220 A | 5/1998 | Smalser, Sr. | |
| 5,928,137 A | 7/1999 | Green | |
| 5,986,752 A | 11/1999 | Morito et al. | |
| 6,043,842 A | 3/2000 | Tomasch et al. | |
| 6,059,719 A | 5/2000 | Yamamoto et al. | |
| 6,086,528 A | 7/2000 | Adair | |

(Continued)

*Primary Examiner* — Behrooz Senfi
(74) *Attorney, Agent, or Firm* — Brinks Gilson & Lione (57) ABSTRACT

A method is provided for manufacturing a remote video inspection device. The method includes: applying an insulating coating to an exterior surface of a conduit; forming an imager housing on one end of the conduit using an overmolding process, the imager housing having a cavity configured to receive a circuit board assembly having an imaging device disposed thereon; feeding wires through the conduit and electrically coupling the wires to the circuit board assembly; inserting the circuit board assembly into the cavity of the imager housing; affixing a cap over the cavity of the imager housing; sliding an insulating finger guard over an opposing end of the conduit; affixing the finger guard along the conduit at a location proximate to the opposing end of the cable, such that the finger guard extends radially outward from the cable; and attaching a connector to the opposing end of the conduit. In this way, the remote inspection device has been designed to meet certain electrical safety standards.

13 Claims, 7 Drawing Sheets

(56) References Cited

U.S. PATENT DOCUMENTS

| | | | |
|---|---|---|---|
| 6,091,453 | A | 7/2000 | Coan et al. |
| 6,221,007 | B1 | 4/2001 | Green |
| 6,369,849 | B1 | 4/2002 | Rzyski |
| 6,419,626 | B1 | 7/2002 | Yoon |
| 6,530,807 | B2 | 3/2003 | Rodrigues et al. |
| 6,538,732 | B1 | 3/2003 | Drost et al. |
| 6,599,238 | B2 | 7/2003 | Ooshima et al. |
| 6,875,169 | B2 | 4/2005 | Berci et al. |
| 7,009,698 | B2 | 3/2006 | Drost et al. |
| 7,048,579 | B2 | 5/2006 | Montena |
| 7,156,695 | B2 | 1/2007 | Holliday |
| 7,241,164 | B2 | 7/2007 | Holliday |
| 7,264,503 | B2 | 9/2007 | Montena |
| 7,384,308 | B2 | 6/2008 | Boehnlein et al. |
| 7,422,559 | B2 * | 9/2008 | Kehoskie et al. ............. 600/140 |
| 2004/0054254 | A1 | 3/2004 | Miyake |
| 2004/0061487 | A1 * | 4/2004 | Reasoner .................... 324/72.5 |
| 2004/0097130 | A1 | 5/2004 | Holliday |
| 2004/0110418 | A1 | 6/2004 | Holliday et al. |
| 2004/0193007 | A1 | 9/2004 | Martone et al. |
| 2004/0198095 | A1 | 10/2004 | Laverick |
| 2005/0048836 | A1 | 3/2005 | Holliday |
| 2005/0088168 | A1 * | 4/2005 | Reasoner ................... 324/158.1 |
| 2005/0249965 | A1 * | 11/2005 | Florek et al. .................. 428/614 |
| 2008/0314613 | A1 * | 12/2008 | Huang et al. .................. 174/107 |
| 2010/0033563 | A1 * | 2/2010 | Boehnlein et al. .............. 348/84 |
| 2011/0011613 | A1 * | 1/2011 | Brown et al. ................ 174/68.3 |
| 2011/0152791 | A1 * | 6/2011 | Kobayashi .................... 604/265 |

* cited by examiner

INSULATOR DESIGN FOR VIDEO INSPECTION DEVICES

CROSS-REFERENCE TO RELATED APPLICATIONS

This application claims the benefit of U.S. Provisional Application No. 61/330,594 filed on May 3, 2010. The entire disclosure of the above application is incorporated herein by reference.

FIELD

The present disclosure relates to borescopes and other types of video inspection devices.

BACKGROUND

Borescopes and video scopes for inspecting visually obscured locations are typically tailored for particular applications. For instance, some borescopes have been tailored for use by plumbers to inspect pipes and drains. Likewise, other types of borescopes have been tailored for use by mechanics to inspect interior compartments of machinery being repaired. This disclosure contemplates aspects of a borescope that have been tailored for use by electricians or in electrical applications. More specifically, the borescope has been designed to meet certain electrical safety standards, such as the CAT III or CAT IV ratings issued by or referenced by the International Electrotechnical Commission (IEC).

Test instruments are rated on their ability to withstand a voltage spike, which is applied through a specified level of resistance. The higher the category, the more risk that a high voltage can overload a circuit and cause electrical and/or physical damage. For example, CAT III-rated test instruments can withstand the transient voltage range found on most distribution circuits; whereas, CAT IV-rated test instruments are designed for testing on the primary supply source, which include 120V or 240V overhead or underground lines. The CAT IV rating covers the highest and most dangerous level of transient overvoltage an electrician encounters when working on utility service equipment like exterior transformers. While conventional test instruments have been designed to meet CAT III or CAT IV ratings, emerging products such as video inspection devices have not previously met these types of electrical safety standards. Therefore, it is desirable to provide an enhanced borescope or video inspection device that meets certain electrical safety standards.

This section provides background information related to the present disclosure which is not necessarily prior art.

SUMMARY

In one aspect of the disclosure, a remote inspection device has been designed to meet certain electrical safety standards. The inspection device includes: a circuit board assembly having an imaging device disposed at an outwardly facing end of the circuit board assembly; a display housing having a display device, an image processor and a power source; and a cable having a first end coupled to the circuit board assembly and a second end coupled to the display housing, where the cable is comprised of a metal conduit encased by an insulating material. An imager housing is formed on one end of the conduit using an overmolding process, thereby encasing the circuit board assembly and encircling a portion of the first end of the cable. A finger guard extends radially outward from the cable and is affixed along the cable at a location proximate to the display housing.

In another aspect of the disclosure, a method is provided for manufacturing a remote video inspection device. The method includes: applying an insulating coating to an exterior surface of a conduit; forming an imager housing on one end of the conduit using an overmolding process, the imager housing having a cavity configured to receive a circuit board assembly having an imaging device disposed thereon; feeding wires through the conduit and electrically coupling the wires to the circuit board assembly; inserting the circuit board assembly into the cavity of the imager housing; affixing a cap over the cavity of the imager housing; sliding an insulating finger guard over an opposing end of the conduit; affixing the finger guard along the conduit at a location proximate to the opposing end of the cable, such that the finger guard extends radially outward from the cable; and attaching a connector to the opposing end of the conduit.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
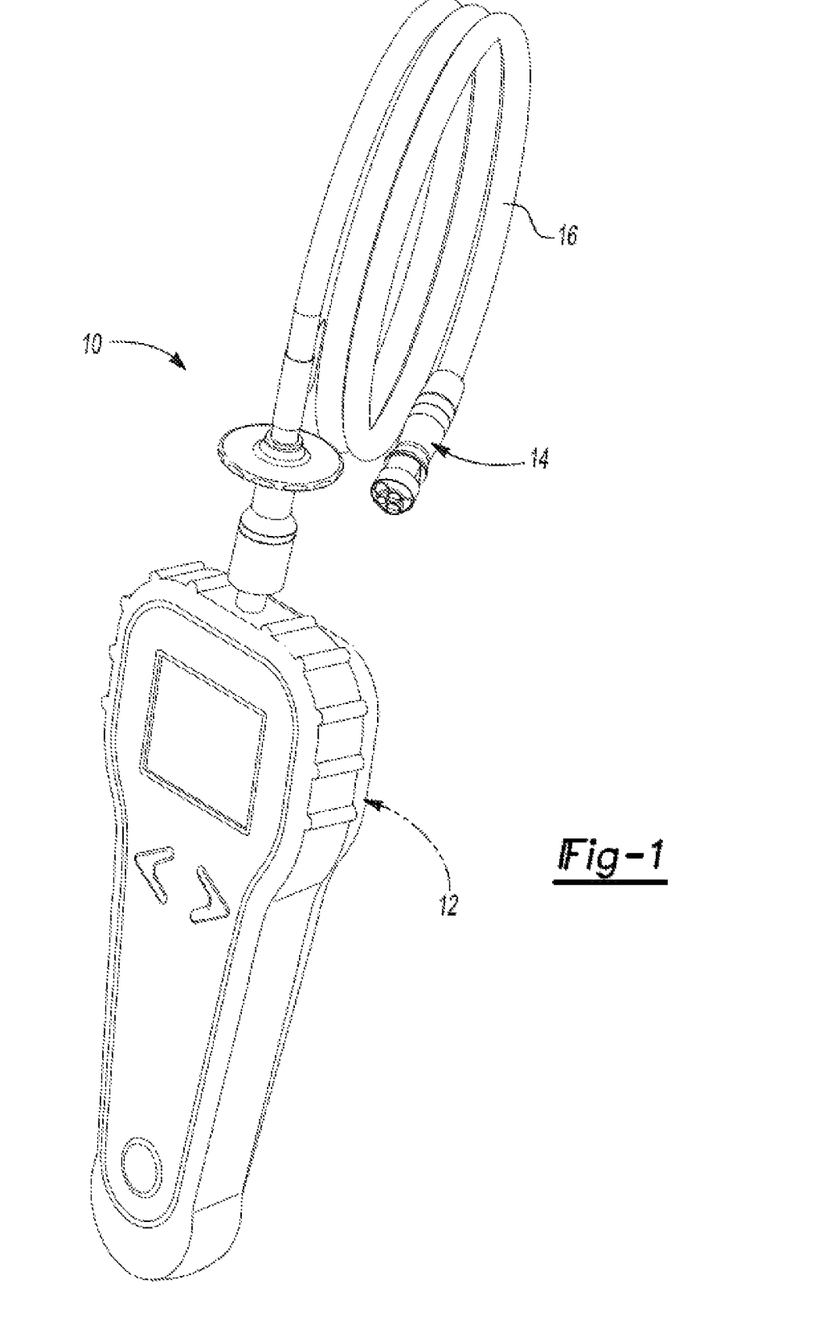
FIG. 1 is a perspective view of an exemplary video inspection device.

FIG. 1 illustrates an exemplary embodiment of a video inspection device 10. The video inspection device 10 is generally comprised of: a display housing 12, an imager housing 14 and a flexible cable 16 interconnecting the imager housing 14 to the display housing 12. An exemplary video inspection device 10 is further described in U.S. Patent Publication No. 2006/0281972 which is incorporated herein by reference. Other types of video inspection devices are commercially available from manufacturers such as Milwaukee and Ridge Tool. While reference is made to a particular video inspection device, it is readily understood that the concepts disclosed in this application are applicable to other inspection devices.

The imager housing 14 is coupled to a distal end of the flexible cable 16. In the exemplary embodiment, the imager housing 14 is a substantially cylindrical shape that is concentrically aligned with the flexible cable 16. However, it is envisioned that the imager housing 14 may take other shapes. Although not limited thereto, an outer diameter of the cylindrical imager housing 14 is preferably sized to be substantially equal to the flexible cable 16.

In the exemplary embodiment, the display housing 12 includes a handle portion configured to be grasped by an operator of the device and a viewing portion extending upwardly from handle portion when grasped by the user. The display housing 12 supports a display device that is preferably orientated towards the operator as the operator grasps the handle portion of the device. The display housing 12 supports other operational components of the inspection device, including user input components, a video decoder, and a power source (e.g., 4 AA alkaline batteries).

During operation, image assembly 14 may be pushed into visually obscured areas, such as pipes, walls, etc. The flexible cable 16 is designed to bend or curve as it meets resistance. The cable 16 may be constructed from a ribbed cylindrical conduit that houses wires therein. The conduit can be made of either a metal, plastic or composite material. In an exemplary embodiment, the flexible cable 16 has an outer diameter in the range of 1 cm. Smaller or larger diameters may be suitable depending on the application. Likewise, other suitable constructions for the flexible cable 16 are also contemplated by this disclosure.

Figure 2:
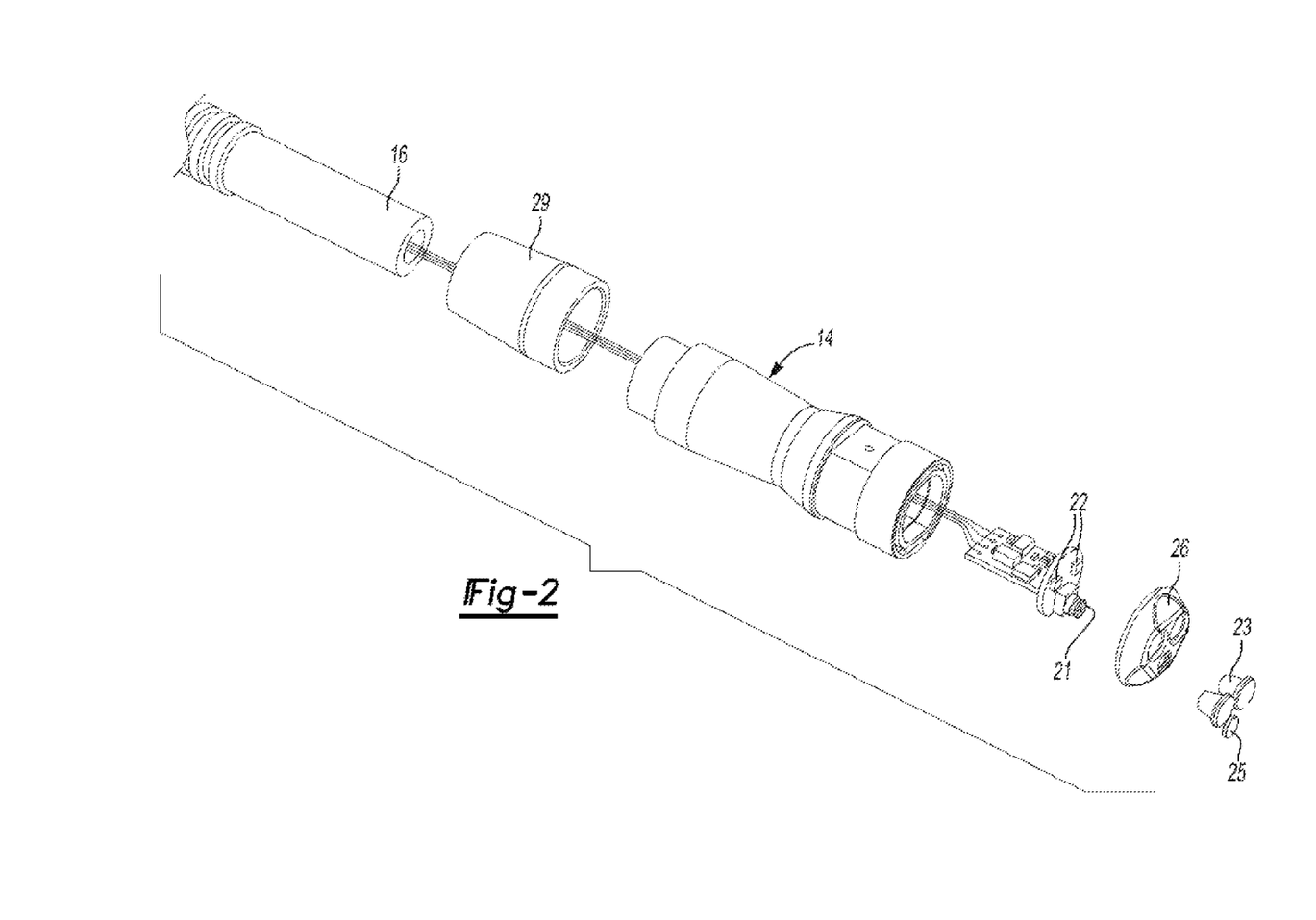
FIG. 2 is an exploded view of an imager assembly of the video inspection device.

With reference to FIG. 2, the imager housing 14 is configured to house an imaging device 21 and one or more light sources 22 affixed to a circuit board 24. In the exemplary embodiment, the imaging device 21 is disposed at an outwardly facing end of the imager housing 14. Thus, the imaging device 21 is operable to capture images of a viewing area proximate to the outwardly facing end of the imager housing 14. The imaging device 21 may be implemented using a charge-coupled device (CCD), a CMOS-based image sensor, a digital image sensor, or other types of commercially available imaging devices. Image data may optionally be focused onto the imaging device by a lens assembly (not shown) positioned adjacent to the imaging device 21.

The light sources 22 are operable to illuminate the viewing area proximate to the imaging device 21. In the exemplary embodiment, two light emitting diodes (LEDs) are disposed adjacent to the imaging device 21. Light from the LEDs is transferred or piped via light pipes 23 to an emitting point which extends above and beyond the imaging device 21. Recessing the imaging device and lens assembly behind the light emitting point reduces the amount of backscattered or interfering light from the LEDs.

A cap 26 encloses these components within the imager housing 14. In the exemplary embodiment, the cap provides holes for supporting the light pipes 25 as well as a sapphire window 25 that protects the imager 21. Alternatively, the cap 26 may be made of a transparent material that enables light to project from the light sources 22 into the viewing area and return from the viewing area to the imaging device 21. The cap 26 is preferably glued or ultrasonically welded to the outwardly facing end of the imager housing 14, thereby creating a sealed enclosure. Other techniques for sealing the cap to the imager housing are also contemplated.

Figure 3:
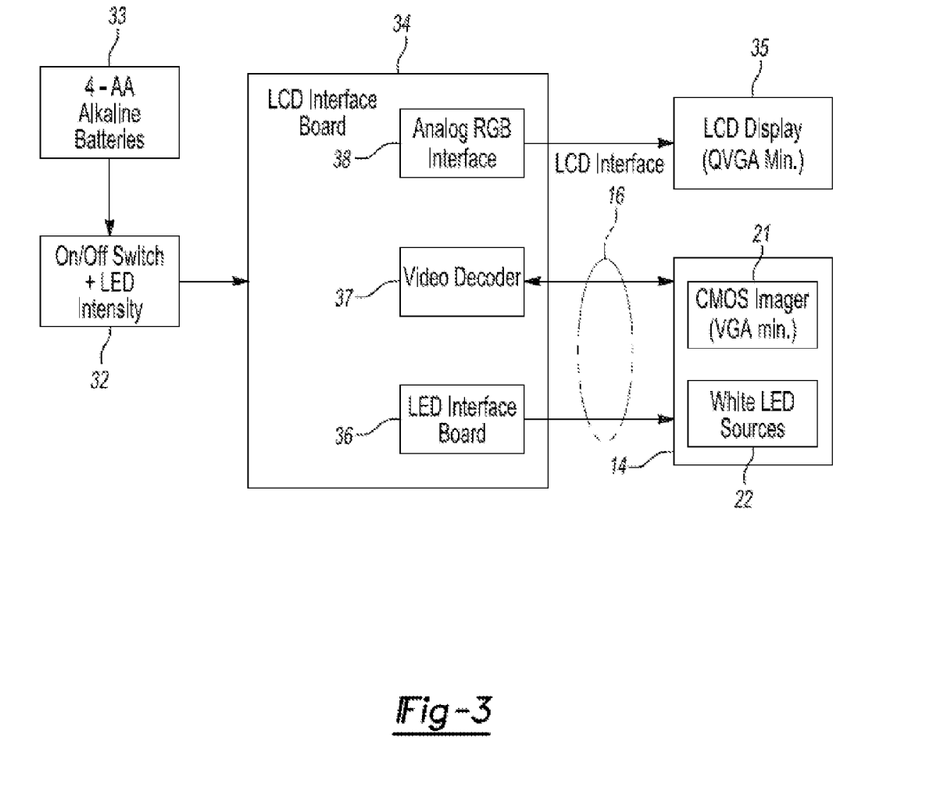
FIG. 3 is a block diagram of the operational components of the video inspection device.

Operational aspects of the inspection device 10 are better understood from the block diagram depicted in FIG. 3. In the exemplary embodiment, a power switch 32 is interposed between a power source 33 and the remaining operational components. When actuated by an operator to an ON position, power is supplied from the power source 33 to the interface board 34. The interface board 34 in turn powers a display device 35.

The display unit may offer additional controls to control (amongst other things) the intensity of the light sources 22. To do so, power is supplied to an LED interface board 36. The LED interface board 36 in turn sends a control signal to the LEDs based on the setting of user interface controls. In this way, the operator can adjust the illumination of the viewing area, thereby improving the quality of the acquired images. Alternative embodiments of the inspection device may employ other user actuated controls. For example, the inspection device may include controls for the contrast of the display device, on-screen display or for a zoom function of the imaging device.

Once powered on, the imaging device 21 begins capturing images and transmitting the image data as a video signal to a video decoder 37 residing on the interface board 34. The video decoder 37 decodes the video signal and passes it through another interface 38 to the display device 35. The display device 35 operates to display the video images to the operator.

Figures 4A, 4B, 4C:
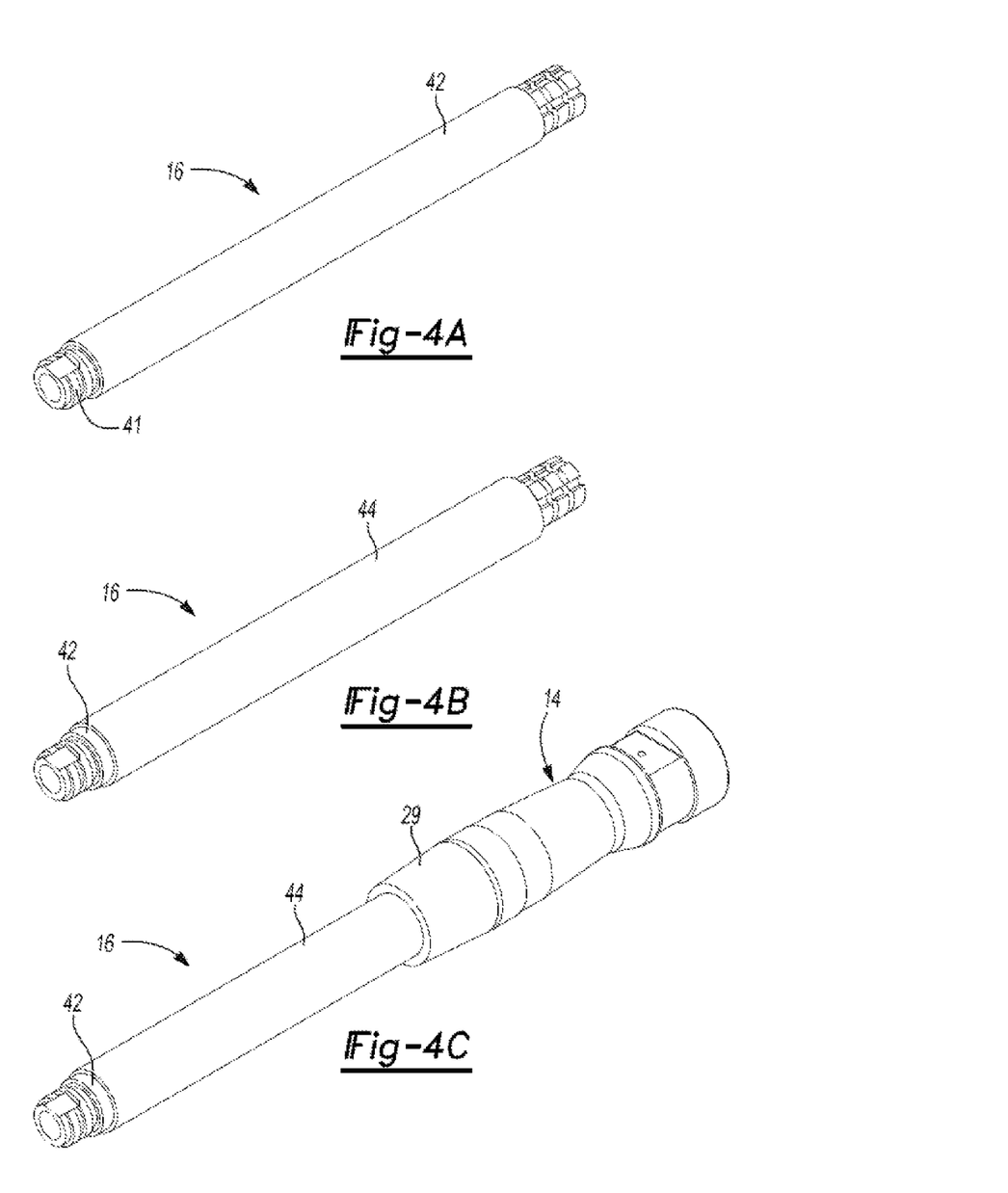
FIGS. 4A-4F are diagrams illustrating an exemplary method for constructing portions of the video inspection device.

A method for constructing a video inspection device is further described in relation to FIGS. 4A-4F. A flexible metal conduit 41 serves as the primary construct for the cable 16 connecting the imager housing to the display housing. In FIG. 4A, an insulating coating 42 is first applied to the exterior surface of the conduit 41. The insulating coating may extend the entire length of the conduit 41 or a substantial portion of the length and has a thickness on the order of 1.2 mm. In an exemplary embodiment, the insulated coating is a silicone material applied using an overmolding process. In another embodiment, the insulating coating is a shrink wrap material such as a polymer film that shrinks when heat is applied. Other types of insulating materials and techniques for applying such materials are contemplated by this disclosure. The insulating coating is designed to comply with commercial safety standards governing such electrical devices. One such standard is the CAT IV rating issued by the International Electrotechnical Commission (IEC). Configuring insulation of the flexible cable to comply with other safety standards, is also contemplated by this disclosure.

A second insulating coating 44 is applied directly over the insulating coating 42 first applied to the conduit 41 as shown in FIG. 4B. The color of the second or outer coating 44 is preferably different than the color of the first or interior coating 42. In the event the outer coating 44 is compromised (e.g., cut), the contrasting color between the coatings will provide a visual cue to the device operator, thereby indicating a breach in the insulation as well as potential non-compliance with an applicable safety standard.

With reference to FIG. 4C, an imager housing 14 is then formed on one end of the insulated conduit. The imager housing 14 includes a cavity that is configured to receive the circuit board assembly 24 as well as an annular recess sized to receive the insulated conduit. In an exemplary embodiment, the imaged housing 14 is formed from a polymer material (e.g., nylon 66) using an injection molding process (also referred to as overmolding). A plastic sleeve or insert molding sleeve 29 may optionally be slid onto an opposing end of the insulated conduit and positioned adjacent to the imager housing 14. The sleeve is in turn glued or otherwise affixed to the conduit and/or the imager housing 14. The sleeve serves to cover aesthetic defects caused by the injection molding process.

Figure 5A:
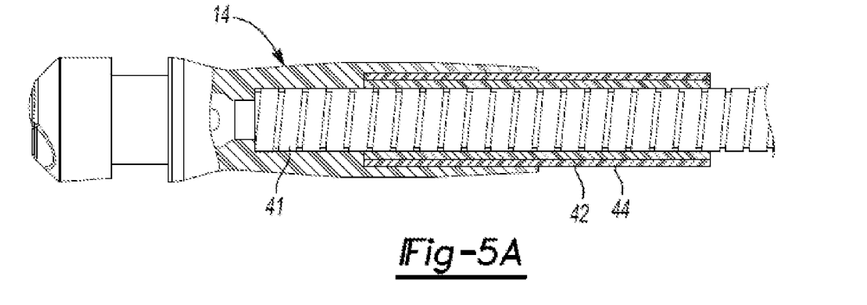
FIGS. 5A-5C are cross-sectional views illustrating different embodiments of the imager assembly.
Figure 5B:
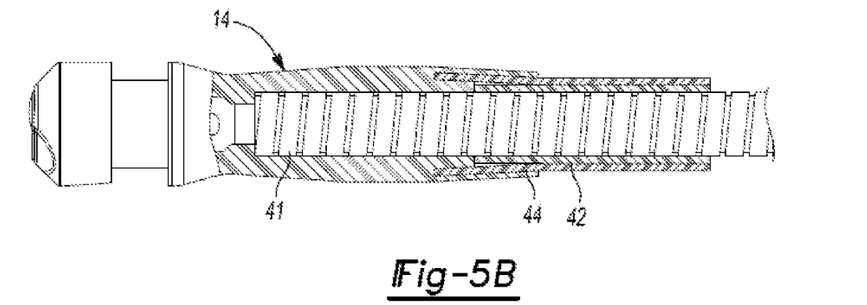
Figure 5C:
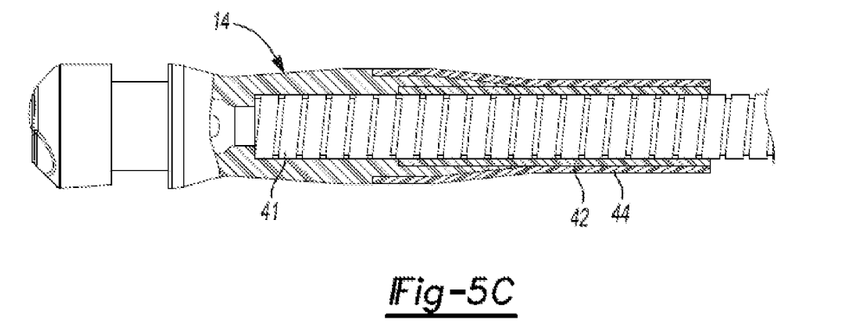
Figure 6:
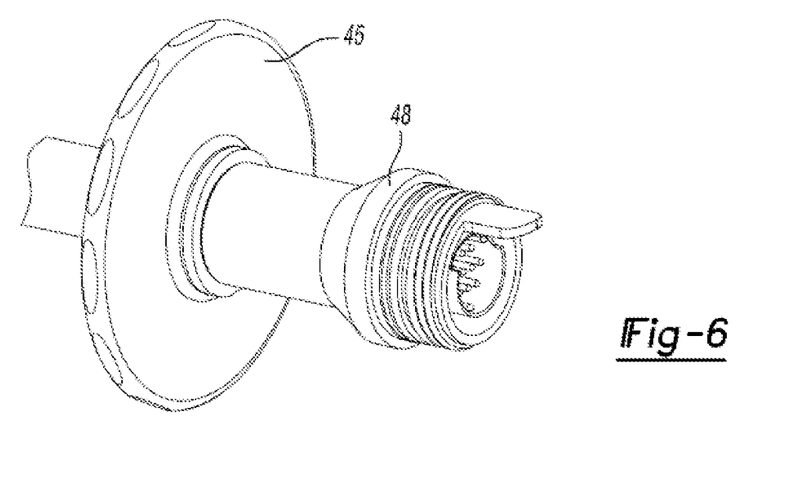
FIG. 6 is a partial perspective view depicting a finger guard employed by the video inspection device.

More specifically, the annular recess of the imager housing encircles an end portion of the conduit as shown in FIGS.

5A-5C. In FIG. 5A, the metal conduit 41 extends beyond the insulating coatings 42, 44. The annular recess encircles the metal conduit 41 and extending over at least a portion of the insulating coatings 42, 44. In FIG. 5B, the annular recess may define a slot 51 that received the outer insulating coating 44. In an alternative construction, the imager housing is formed on one end of the insulated conduit before the second insulating coating is applied to the conduit. A second insulating coating 44 is then applied over the first insulating coating 42, such that the second insulating coating 44 encases a portion of the imager housing that encircles the end portion of the conduit as shown in FIG. 5C. In each of the exemplary embodiments, the overlap defines the linear distance or "creepage" path an electrical signal would need to travel from outside the imager housing 14 to reach internal components (including a metal conduit) and potentially compromising the system. Thus, the amount of overlap between the annular recess and the insulating coatings is designed to meet applicable safety standards.

A few steps remain to complete assembly of the imager housing. Wires interconnecting the imager with the display housing are fed through the conduit and then electrically coupled to the circuit board assembly. The circuit board assembly is inserted into the cavity of the imager housing. Lastly, a cap is affixed over the cavity of the imager housing, thereby sealing the circuit board in the imager housing. It is readily understood that these remaining assembly steps for the imager housing may occur before or after the steps set forth below.

Figures 4D, 4E, 4F:
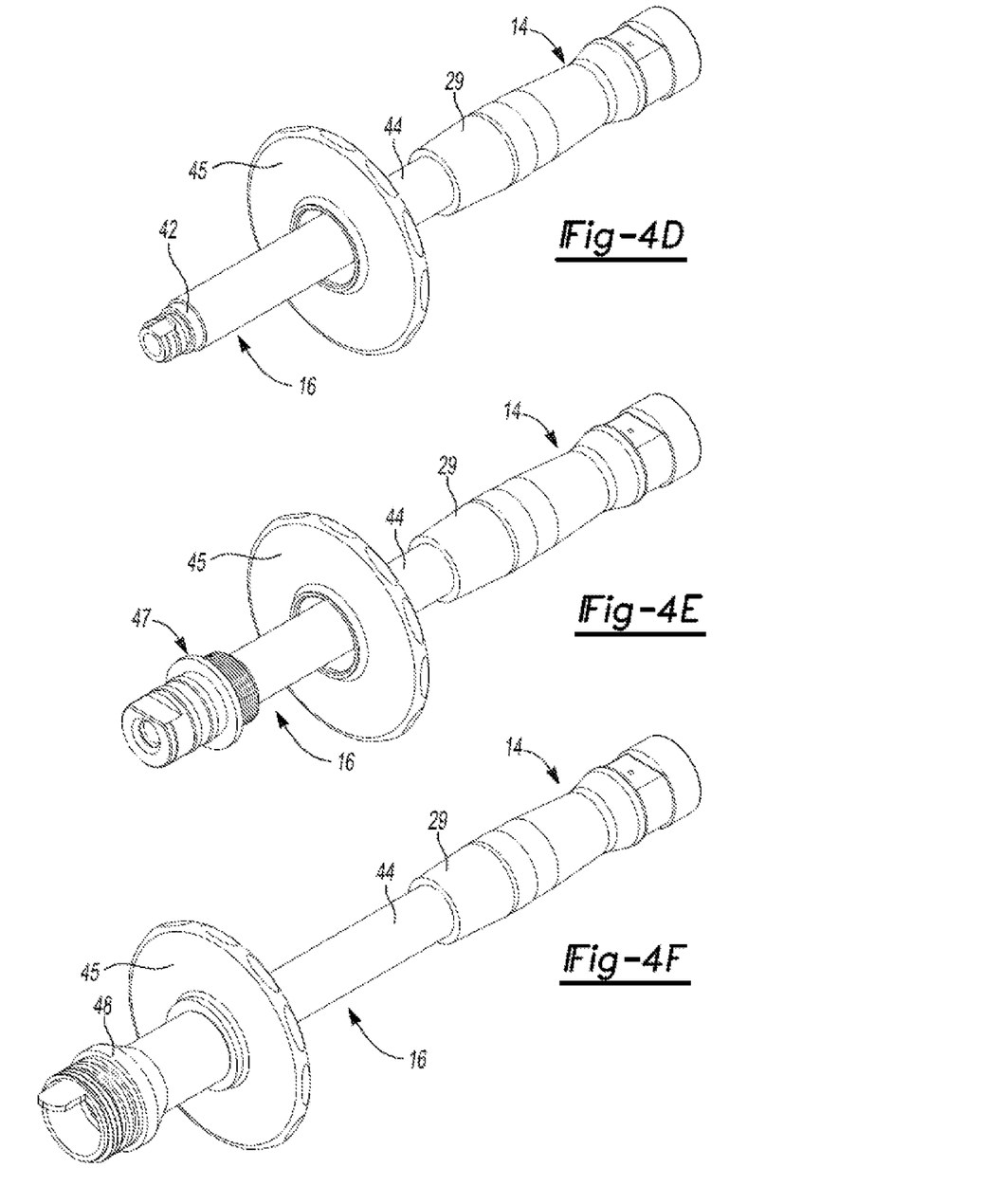

With continued reference to FIG. 4D, a finger guard 45 is also slid over the opposing end of the conduit. The finger stop 45 is intended to suggest an area for the device operator to grasp the cable which is at a safe distance from the imager head in the event the imager housing 14 or cable contacts a live wire. In addition, the finger stop 45 creates a shield around which any transient electrical signal would need to travel to reach the operator. Thus, the radial dimension of the finger stop (i.e., diameter of a disc) is chosen to comply with an applicable safety standard. The finger stop is preferably constructed from an insulating material such as nylon 66. While shown as having a disc shape, it is understood that the finger stop can have other shapes that extend radially outward from the cable.

Location of the finger guard 45 along the conduit is also designed to comply with an applicable safety standard. In an exemplary embodiment, the finger guard is affixed at the opposing end of the conduit proximate to the display housing. More specifically, a ferrule 47 is molded onto the opposing end of the conduit as shown in FIG. 4E, where the ferrule may include a threaded portion. The finger guard 45 is in turn screwed onto the threaded portion of the ferrule and/or glued onto the ferrule. The remaining portion of the connector 48 is press fit onto the ferrule 47 as shown in FIG. 4E. Connector 48 may have a design similar to the connector described in U.S. Pat. No. 7,384,308 which is incorporated herein by reference. The connector 48 enables the cable 16 to detachably connect to the display housing 12.

Figure 7:
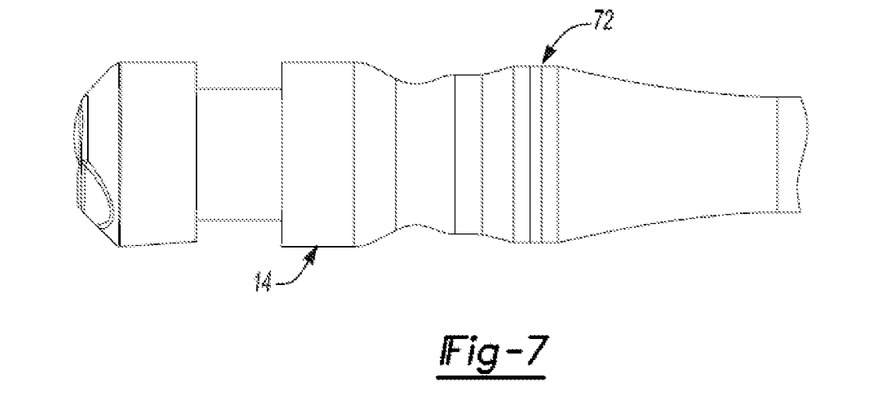
FIG. 7 is a partial side view depicting a flared out section along the cable of the video inspection device.

In lieu of or in addition to the finger stop, the imager housing 14 and/or the insulated conduit may be formed with a flared out section 72 as shown in FIG. 7. Likewise, the flared out section 72 is intended to suggest an area for the device operator to grasp which is at a safe distance from a point at which the imager housing 14 may contact a live wire. In an exemplary embodiment, the flared out section is formed by the overmolding process of the imager housing. Size and location of the flared out section are thus designed to comply with applicable safety standards.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A remote inspection device, comprising:
   a circuit board assembly having an imaging device disposed at an outwardly facing end of the circuit board assembly, the imaging device being operable to capture an image of a viewing area proximate to the outwardly facing end of a flexible cable and convert the image into a video signal;
   a display housing having an image processor adapted to receive the video signal from the imaging device and operable to convert the video signal to a video image for display on a display device residing in the display housing;
   the cable having a first end coupled to the circuit board assembly and a second end coupled to the display housing, the cable comprised of a metal conduit encased by an insulating material and housing a plurality of wires therein, where the wires operably connect the imaging device to the power source and the image processor, the insulating material having a first layer and a second layer, wherein the first layer extends along the cable toward the first end beyond the second layer;
   an imager housing encasing the circuit board assembly and encircling a portion of the first end of the cable; and
   a finger guard that extends radially outward from the cable and positioned along the cable at a location proximate to the display housing, wherein the finger guard has a hole passing therethrough for receiving the cable.

2. The inspection device of claim 1 wherein the metal conduit is encased by two distinct layers of insulating material, a first layer over a second layer, each layer having a different color.

3. The inspection device of claim 1 wherein the imager housing having a cavity configured to receive the circuit board assembly and an annular channel sized to receive an end of the cable.

4. The inspection device of claim 1 wherein the finger guard is comprised of an insulating material.

5. The inspection device of claim 1 further comprises a connector disposed on the second end of the cable for detachably coupling the cable to the display housing.

6. The inspection device of claim 1 configured to meet a category IV rating in accordance with safety standards issued by the International Electrotechnical Commission (IEC).

7. The inspection device of claim 1, wherein the finger guard comprises a flared out section of the imager housing.

8. The inspection device of claim 1, further comprising:
   a ferrule molded onto the cable, proximate to the display housing, and wherein the finger guard is affixed to the ferrule.

9. A remote inspection device, comprising:
   a circuit board assembly having an imaging device disposed at an outwardly facing end of the circuit board assembly, the imaging device being operable to capture an image of a viewing area proximate to the outwardly facing end of a flexible cable and convert the image into a video signal;

a display housing having an image processor adapted to receive the video signal from the imaging device and operable to convert the video signal to a video image for display on a display device residing in the display housing;

the cable having a first end coupled to the circuit board assembly and a second end coupled to the display housing, the cable comprised of a metal conduit encased by an insulating material and housing a plurality of wires therein, where the wires operably connect the imaging device to the power source and the image processor;

an imager housing encasing the circuit board assembly and encircling a portion of the first end of the cable; and a finger guard that extends radially outward from the cable and positioned along the cable at a location proximate to the display housing, wherein the finger guard has a hole passing therethrough for receiving the cable;

a ferrule molded onto the cable, proximate to the display housing, and wherein the finger guard is affixed to the ferrule, wherein the ferrule comprises a threaded portion and the finger guard is screwed onto the threaded portion of the ferrule.

10. The inspection device of claim 8, wherein the finger guard is glued onto the ferrule.

11. The inspection device of claim 3, wherein the first layer extends along the cable toward the first end beyond the second layer.

12. A remote inspection device, comprising:
a circuit board assembly having an imaging device disposed at an outwardly facing end of the circuit board assembly, the imaging device being operable to capture an image of a viewing area proximate to the outwardly facing end of a flexible cable and convert the image into a video signal;

a display housing having an image processor adapted to receive the video signal from the imaging device and operable to convert the video signal to a video image for display on a display device residing in the display housing;

the cable having a first end coupled to the circuit board assembly and a second end coupled to the display housing, the cable comprised of a metal conduit encased by an insulating material and housing a plurality of wires therein, where the wires operably connect the imaging device to the power source and the image processor, the insulating material having a first layer and a second layer;

an imager housing encasing the circuit board assembly and encircling a portion of the first end of the cable; and a finger guard that extends radially outward from the cable and positioned along the cable at a location proximate to the display housing, wherein the finger guard has a hole passing therethrough for receiving the cable;

a ferrule molded onto the cable, proximate to the display housing, and wherein the finger guard is affixed to the ferrule, wherein the first layer extends along the cable toward the first end beyond the second layer, wherein the imager housing is molded over the second layer and the first layer extending over the imager housing.

13. The inspection device of claim 3, wherein the imager housing is molded over the first layer and the second layer.

* * * * *